ANALOG-TO-DIGITAL CONVERTER

Filed April 26, 1966 2 Sheets-Sheet 1

INVENTOR
Philip A. Hoffman
BY Le Blanc & Shur
ATTORNEYS

ANALOG-TO-DIGITAL CONVERTER

Filed April 26, 1966

2 Sheets-Sheet 2

INVENTOR
Philip A. Hoffman

BY Le Blanc & Shur
ATTORNEYS

United States Patent Office 3,462,759
Patented Aug. 19, 1969

3,462,759

ANALOG-TO-DIGITAL CONVERTER

Philip A. Hoffman, Towson, Md., assignor, by mesne assignments, to The Bendix Corporation, a corporation of Delaware Filed Apr. 26, 1966, Ser. No. 545,395
Int. Cl. H047 *3/00;* H03k *13/02*
U.S. Cl. 340—347 14 Claims

ABSTRACT OF THE DISCLOSURE

Disclosed is a binary coded decimal analog to digital converter. The converter is of the charge transfer, successive approximation type wherein a charge transfer amplifier has a feedback capacitor which receives a signal representative of the analog input. The capacitor signal is reduced in steps and after each step compared with a reference signal to generate a digital output code. A novel weighting capacitor and switching arrangement make possible the generation of a binary coded decimal output.

This invention relates to an analog-to-digital converter and more particularly to a simplified charge transfer type converter, particularly suited for use in producing a binary coded decimal output signal.

Analog-to-digital converters are well known and are useful in a variety of applications such as in the field of telemetry for changing the analog outputs of various types of transducers including accelerometers, temperature gauges, and the like into electrical impulses. Converters are also used in voice encoding and for voice communication in which applications they provide communication links having superior fidelity and other desirable characteristics. More recently converters have also been finding use for electrically controlling machinery, particularly machine tools.

The term analog-to-digital converter implies that the output is in a discrete or digital form. However, digital outputs may take any of several desired formats, including a straight binary code, a decimal output, a binary coded decimal format, or any one of an almost unlimited number of special purpose digital codes. When the converter is used in conjunction with decimal display devices such as rotary counters and registers, a binary coded decimal output is quite useful. This type of format also finds use in read-in devices operated in conjunction with modern digital computers.

The present invention provides an extremely simplified and inexpensive binary coded decimal analog-to-digital converter of the charge transfer type, wherein a charge is distributed or shared between two or more capacitors. In the past, BCD converters have been quite complicated and expensive, requiring a number of precision electrical elements (usually resistors) for developing the desired signals, or have been relatively slow of operation. These disadvantages are avoided in the present invention by the provision of a novel circuit in which a pair of equal capacitors are periodically connected in series with the input of a charge transfer amplifier. The amplifier is heavily fed back through a feedback capacitor so as to develop an output signal indicative of the charge shared between the two equal capacitors. As opposed to straight binary conversion, a binary coded decimal output format is achieved through the addition of a simplified capacitor switching circuit to produce at the converter output a pulse signal representative of the binary coded decimal equivalent of the analog input signal.

It is therefore one object of the present invention to provided an improved analog-to-digital converter.

Another object of the present invention is to provide a simplified, inexpensive analog-to-digital converter, having a binary coded decimal output.

Another object of the present invention is to provide a converter of the charge sharing type, wherein a pair of charge sharing capacitors are coupled to the input of a charge transfer amplifier and charge is weighted in such a manner as to produce a binary coded decimal signal at the output of the converter.

Another object of the present invention is to provide a novel method of binary coded decimal conversion.

These and further objects and advantages of the invention will be more apparent upon reference to the following specification, claims and appended drawings wherein:

FIGURES 3 through 6 illustrate some of the important steps in the sequence of operation of the converter of FIGURE 1, these steps being keyed to the timing diagram of FIGURE 2.

Figure 1:
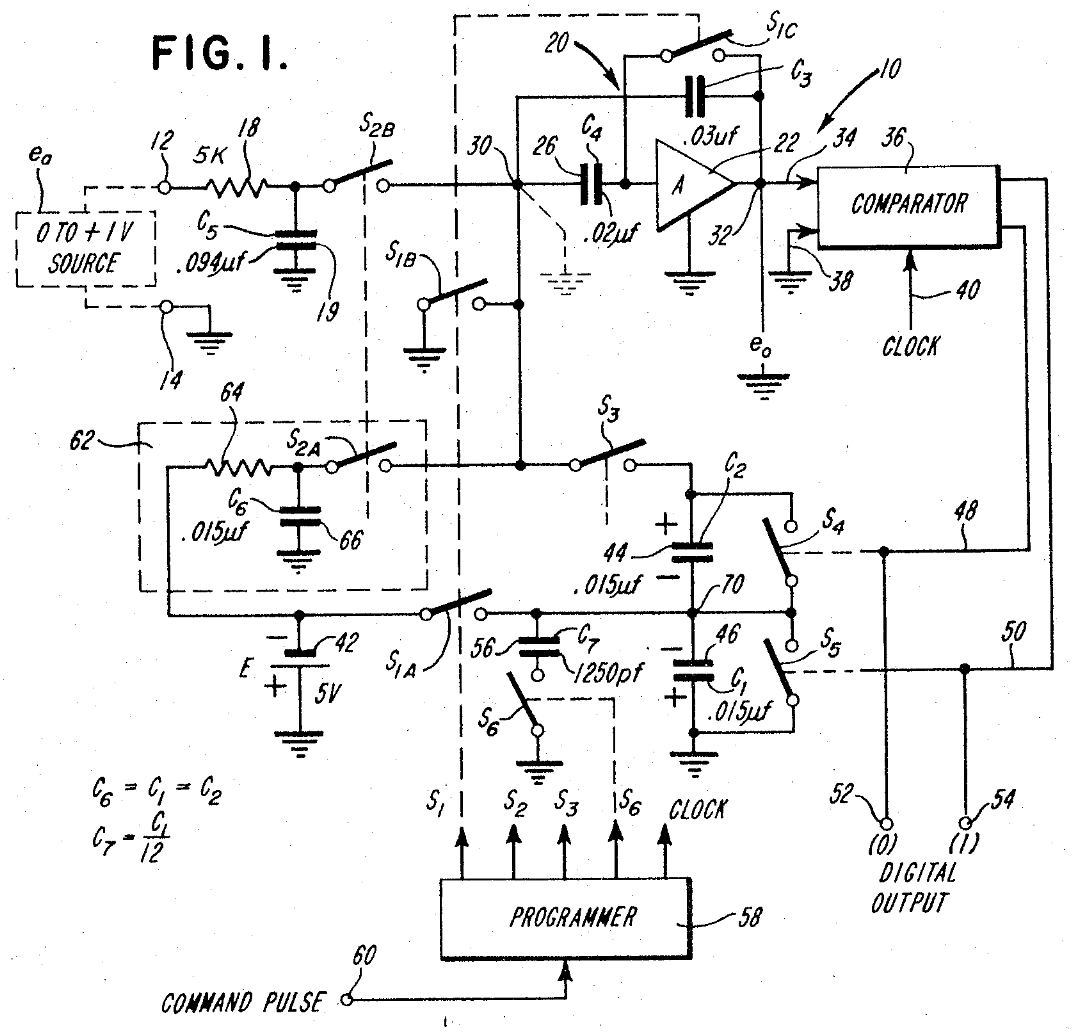
FIGURE 1 is a block diagram of a binary coded decimal analog-to-digital converter constructed in accordance with the present invention.

Referring to the drawings, the novel converter of the present invention generally indicated at 10 in FIGURE 1 includes a pair of input terminals 12 and 14 for receiving an analog input voltage $e_a$ from an analog voltage source indicated by dashed lines at 16. This analog voltage source may take the form of a strain gauge, pressure transducer, accelerometer, or the like. The signal for source 16 passes through an input resistor 18 to a sampling capacitor 19 labelled $C_5$. This signal is in turn fed through section B of a ganged switch $S_2$ to a charge transfer amplifier generally indicated at 20. Typical values for the circuit elements are indicated in FIGURE 1 of the drawings.

Charge transfer amplifier 20 comprises a high gain amplifier 22 having an internal ground as indicated at 24, an input coupling capacitor 26 labelled $C_4$, and a feedback capacitor 28 labelled $C_3$. Switch poles $S_{1B}$ and $S_{1C}$ are provided for the purpose of establishing initial conditions at nodes 30 and 32, after which input node 30 of amplifier 20 is maintained at or very near ground potential by means of negative feedback through the feedback capacitor 28, the amplifier being heavily fed back through this capacitor in a manner well known in operational amplifiers. An output voltage $e_o$ is developed at the amplifier output terminal 32. This voltage is fed to one input 34 of a voltage comparator 36, the other input terminal 38 of the comparator being connected to a reference potential, for example ground. The comparator is triggered by a clock pulse by way of comparator input lead 40.

Also provided in the converter 10 is a standard reference voltage source 42 having a voltage E, which is illustrated by way of example only as —5 volts. The negative terminal of the battery or source 42 is connected through section A of ganged switch $S_1$ to the adjacent sides of a pair of equal charge sharing capacitors 44 and 46. Capacitor 44 is labelled $C_2$ and capacitor 46 is labelled $C_1$. Capacitor 44 is shunted by a shorting switch $S_4$, while capacitor 46 is similarly shunted by a shorting switch $S_5$. Shorting switch $S_4$ is actuated by a signal appearing on the output lead 48 of the comparator 36 while switch $S_5$ is actuated or closed by a voltage impulse appearing on output lead 50 of the comparator. The digital output signal is taken from either lead 48 or lead 50 at either one of the optional digital output terminals 52 or 54.

Section B of switch $S_1$ in conjunction with switch $S_{1c}$ acts as a shorting switch for the input capacitor 26 and feedback capacitor 28 of the charge transfer amplifier. Capacitor 26 is provided to eliminate the bias effect of the imperfect amplifier 22. It ($C_4$) is discharged to the bias potential of amplifier 22 (assuming no switch error) when switch $S_{1B}$ is closed. Capacitor 28 also assumes the amplifier bias potential (except for switch errors) when switches $S_{1B}$ and $S_{1C}$ are closed at the same time.

All the switches disclosed and shown in FIGURE 1 are preferably solid state devices which are normally open, close when triggered, and reopen automatically shortly thereafter. They are illustrated in the drawing as relay type switches only for the sake of clarity and simplicity.

An important feature of the invention illustrated in FIGURE 1 is the provision of an aditional capacitor 56 labelled $C_7$ and a switch $S_6$ connecting this capacitor to ground in a novel manner to provide binary coded decimal conversion. This switch along with the other switches and the comparator are operated by the various pulse outputs from a programmer 58 receiving a command signal at programmer input terminal 60. A command pulse at terminal 60 initiates an encoding period or encoding cycle in the programmer.

Finally, the converter circuit of FIGURE 1 includes a compensating circuit enclosed by the dashed box 62 comprising a resistor 64 connecting battery 42 to a unipolar compensating capacitor 66 labelled $C_6$. This capacitor is in turn connected to the input of the charge transfer amplifier through Section A of ganged switch $S_2$.

Figure 2:
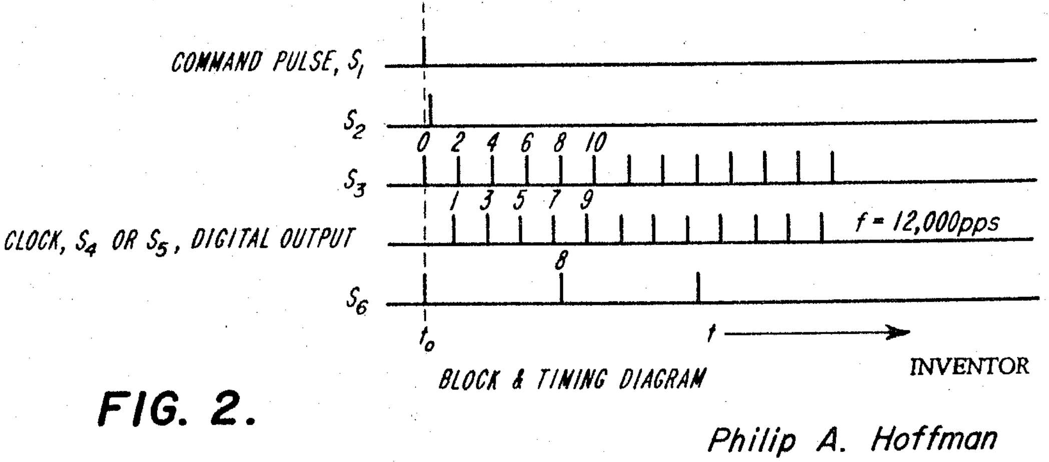
FIGURE 2 is a timing diagram for the converter of FIGURE 1.

The programmer output pulse sequence for a typical encoding cycle is illustrated in the timing diagram of FIGURE 2. These pulses correspond to the closure times of the various switches which bear the same subscripts as the programmer outputs. The ganged nature of various switches is indicated by the dash lines in FIGURE 1. As illustrated by way of example only, the clock pulse or digital output frequency of the comparator is at a rate of 12,000 pulses per second and various steps in the sequence of operation are indicated by the numerals 0 through 10 in FIGURE 2. Reference will be had to these numerals in conjunction with the later description of FIGURES 3 through 6 illustrating important steps in the sequence of operation of the converter circuit of FIGURE 1.

Before proceeding with a description of the operation of the converter it should be noted that the present invention provides a novel method of obtaining a binary coded decimal output through a sequence of operations on an analog input signal initially applied to capacitor $C_3$ from capacitor $C_5$. That is, the value of the analog signal on capacitor $C_3$ is modified according to the following quasi-binary series which converges toward zero.

$$e_o=f(e_a)\left[(e_a-.8,\ \pm.4,\ \pm.2,\ \pm.1,\ \begin{pmatrix}+.02\\-.08\end{pmatrix};\ \pm.04,\ \pm.02,\ \pm.01,\ \begin{pmatrix}+.002\\-.008\end{pmatrix};\ \pm.004,\ \pm.002,\ \pm.001,\ \begin{pmatrix}+.0002\\-.0008\end{pmatrix}\right]$$

The signs for the last twelve terms in the right hand side of the equation above represent the digital equivalent of the amplitude of the analog input signal. Plus signs represent binary zeros and minus signs represent binary ones. The signs of the terms $$\pm.4,\ \pm.2,\ \pm.1,\ \begin{pmatrix}+.02\\-.08\end{pmatrix}$$

represent the most significant decimal digit in the 8–4–2–1 binary code. The remaining two decimal digits are represented similarly by the signs of the last eight terms. The sixth $\begin{pmatrix}+.02\\-.08\end{pmatrix}$, tenth $\begin{pmatrix}+.002\\-.008\end{pmatrix}$, and fourteenth $\begin{pmatrix}+.0002\\-.0008\end{pmatrix}$ terms are required for the transition between decimal digits, and result because of the operation of switch $S_6$ at the times shown in the timing diagram of FIGURE 2.

In operation, the input terminals 12 and 14 are connected to a source of analog input voltage 16. As a result acapacitor 19 ($C_5$) charges through resistor 18 to the analog input potential $e_a$ and follows this DC or slowly varying AC input signal. To initiate encoding a command pulse is applied to terminal 60 which starts an internal programming cycle in programmer 58 controlling the switches $S_1$, $S_2$, $S_3$ and $S_6$ and triggering the comparator by way of clock pulses to operate the switches $S_4$ and $S_5$. At the beginning of an encoding cycle identified as time $t_o$ in FIGURE 2, switches $S_1$, $S_3$ and $S_6$ are simultaneously closed, charging capacitors $C_1$ and $C_2$ (which are equal) and capacitor $C_7$ to the reference potential E and at the same time discharging capacitors $C_3$ and $C_4$ (26 and 28). At that time the amplifier output voltage, $e_o$ becomes 0. Switch $S_1$ remains closed for a sufficient time to charge and/or discharge the associated capacitors. Capacitor $C_6$ is at this time charged through resistor 64 to the battery potential E to provide for unipolar operation and capacitor $C_7$ is also charged to the battery potential for reasons more fully explained below.

A sufficient time after $t_o$, and subsequent to the operation of switches $S_1$, $S_3$ and $S_6$, switch $S_2$ is closed discharging capacitors $C_5$ and $C_6$ into capacitor $C_3$. In this discharging action the effect of capacitor $C_4$ (26) can be ignored since this capacitor is relatively large and in any event is shunted by the feedback path through capacitor 28 around the amplifier. That is, at the input node 30 (held at ground potential by feedback) the capacitor $C_3$ appears as though multiplied by substantially the gain of the amplifier 22 without feedback, this latter gain being in the order of several thousand for conventional amplifiers of the type illustrated at 22. As a result of the discharge of capacitors $C_5$ and $C_6$ into capacitor $C_3$ the voltage at the amplifier output $e_o$ changes to $$e_o=-K(e_a-.8\text{ v.})$$

This results from the scale factors of $C_5$, $C_6$ and $C_3$. The above, of course, assumes an analog input voltage $e_a$ having a minimum possible value of 0 and a maximum possible value of +1 volt.

More specifically, referring to the foregoing equation giving the quasi-binary series of operation, it will be noted that the first step in the conversion process is given by the quantity ($e_a$—.8). A charge is supplied to capacitor $C_3$ from capacitor $C_5$ proportional to the analog quantity $e_a$. Similarly a charge proportional to the quantity —.8 in the first conversion step is supplied to capacitor $C_3$ from capacitor $C_6$. If time $t_a$ is equal to the duration of the switch closures and time $t_b$ is equal to the time between switch operations and the times are chosen such that $t_b$ RC $t_a$ (where RC=resistance-capacitance time constant) then no additional switch is required in the circuit. The above relationships hold true both for the input sampling circuit (resistor 18, capacitor $C_5$ and switch $S_{2b}$0) and the unipolar compensation circuit (resistor 64 capacitor $C_6$ and switch $S_{2a}$). In this case the relationship of very much larger is meant that the preceding terms are a factor of 10 or more greater than the following terms so as to give a converter accuracy in the neighborhood of 0.1% for three digit BCD conversion.

The scale factor previously mentioned may be obtained from the values of $C_5$, $C_6$ and $C_3$ given in the drawings (by way of example only). In order to obtain the first step in the conversion process according to the foregoing equation the following relationship should exist for the voltage values given.

$$C_5\ (1\text{ volt})=\frac{10}{8}C_6\ (5\text{ volts})$$

Next the clock triggers the comparator. If $e_o$ is positive ($e_a$ is greater than .8 v.) $S_5$ is closed by the comparator, or $e_o$ is negative ($e_a$ larger than .8 v.) $S_4$ is closed. Thus either $C_1$ or $C_2$ is discharged when the comparator is triggered, depending upon the polarity of the voltage $e_o$ out of the charge transfer amplifier.

Switch $S_4$ (or $S_5$) is then opened and $S_3$ is closed. This causes equal capacitors $C_1$ and $C_2$ to both be charged to E/2 and causes a step in voltage at the amplifier output of $$\pm\frac{KE}{2}$$

The voltage at the output of the amplifier is now $$e_o=+K[(e_a-.8 \text{ v.})\pm.4 \text{ v.}]$$

The plus sign corresponds to a binary 0 in the most significant digit and the minus sign corresponds to a binary 1.

The sequence of clock pulses operating $S_4$ or $S_5$ followed by operations of $S_3$ causes the voltage at the amplifier output $e_o$ to change according to the foregoing quasi-binary series which converges towards zero.

Figures 3, 4A, 4B, 5A, 5B, 6A, 6B:
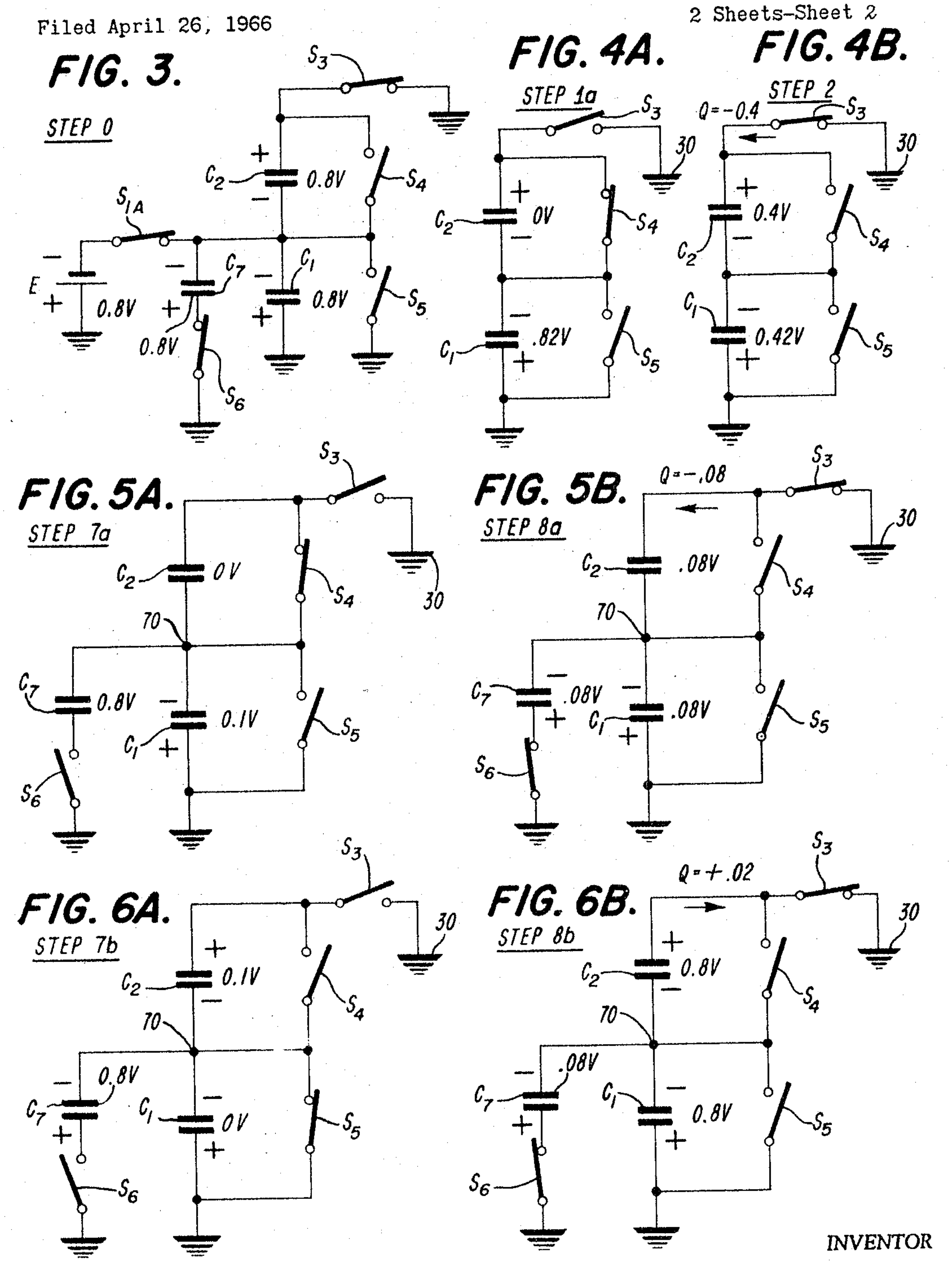

For a better understanding of the operation of switch $S_6$ and the function of weighting capacitor 56 ($C_7$) reference is made to FIGURES 3 through 6. These figures illustrate significant steps in the sequence of operation and are keyed to the steps 0 through 10 for the pulses illustrated in FIGURE 2 showing the closures of switches $S_3$, the alternative digital output switches $S_4$, $S_5$ and switch $S_6$. While the specific circuit of FIGURE 1 illustrates a reference voltage source E of −5 volts, for the sake of simplicity and ease of understanding, FIGURES 3 through 6 will assume a reference voltage source of −0.8 volt. Similarly while the specific circuit of FIGURE 1 shows preferred values for the capacitors it will be assumed in conjunction with the following description of FIGURES 3 through 6 that the capacitors (except for capacitors $C_4$ and $C_7$) are all equal. Thus referring to the foregoing equation and especially to FIGURE 3 illustrating the circuit conditions at step 0 and time=$t_o$ in FIGURE 2, it will be noted that capacitors $C_1$ and $C_2$ charge to the battery potential (in this case .8 volt) with the polarity shown in FIGURE 3. Capacitor $C_7$ which has a capacitive value 1/12 that of capacitor $C_1$ or capacitor $C_2$ is similarly charged to the battery voltage when switch $S_{1a}$ closes at time $t_o$. The charging of capacitor $C_1$ is by way of its direct connection to ground while capacitor $C_2$ charges through switch $S_3$ which at this time is connected to ground through the simultaneously closed switch section $S_{1b}$.

With capacitors $C_5$ and $C_3$ assumed to be equal a charge will be supplied to capacitor $C_3$ from capacitor $C_5$ such that the voltage across capacitor $C_3$ due to this charge is equal to the analog voltage $e_a$. However, at the same time capacitor $C_6$ discharges from the battery potential of −.8 volt into capacitor $C_3$ and if capacitor $C_6$ is also assumed equal to capacitor $C_3$ the output voltage $e_o$ becomes $e_a$ −.8 volt, the first step given in the foregoing equation.

FIGURES 4A and 4B illustrate the subsequent stages of operation and are labelled step 1*a* and step 2, respectively. Step 1*a* shows the circuit connections when an output pulse appears at line 48 to close shorting switch $S_4$. As illustrated in FIGURE 4A when switch $S_4$ closes capacitor $C_2$ discharges through this switch to zero potential or zero voltage.

After switch $S_4$ has opened with capacitor $C_2$ completely discharged a programmer pulse energizes switch $S_3$ indicated as step 2 in the comparison process closing this switch to give the circuit situation illustrated in FIGURE 4B. At this time charge flows from capacitor $C_3$ out of the input node 30 of the amplifier 20 through the capacitors to ground such that capacitors $C_1$ and $C_2$ arrive at an equal potential. That is, the previous charge producing a .8 volt drop across capacitor $C_1$ is distributed or shared between these capacitors such that half the charge passes to capacitor $C_2$ and the total voltage drop across each capacitor is .4 volt with the polarity illustrated in FIGURE 4B. This charge sharing of the capacitors is accompanied by a flow of charge out of input node 30 of the amplifier 20 representing that quantity of charge removed from capacitor $C_3$ (or added if the capacitor was previously charged negative). This is illustrated in FIGURE 4B by the notation charge $Q=-0.4$. The minus sign is given to indicate the charge as flowing out of the input node 30.

As previously described subsequent comparisons are made, the appropriate switch $S_4$ and $S_5$ is closed in accordance with the comparison to discharge one of the capacitors $C_1$ or $C_2$ and then switch $S_3$ is closed so that the charge on the other capacitor is then equally shared between these two capacitors. Each charge sharing is accompanied by a flow of charge into or out of the input node 30 of the amplifier. This sequence of operation is more fully described in assignee's copending application Ser. No. 250,369, filed Jan. 9, 1963, to which reference may be had for a detailed discussion of the operation of charge sharing capacitors 44 and 46. This sequential charge sharing between capacitors produces the third, fourth and fifth quantities in the quasi-binary series given, i.e., the charge on capacitor $C_3$ changes in steps of ±.4, ±.2, and±.1 volt.

At the end of this last sharing step, each of the capacitors $C_1$ and $C_2$ is left with a charge giving a potential drop across each capacitor of .1 volt. FIGURE 5A illustrates the result of the next comparison assuming that a pulse is produced from the comparator on line 48 and switch $S_4$ is closed. The closure of this switch discharges capacitor $C_2$ to zero volts. It is readily apparent that if the previously described sequence were followed, the next charge sharing would produce a flow of charge out of the amplifier node 30 corresponding to a −.05 volt change on capacitor $C_3$. Such a change would, however, violate the series given above which calls for a sixth quantity or incremental change in the output voltage $e_o$ of −.08 volt. In order to provide this change the converter of the present invention includes an additional capacitor $C_7$ and grounding switch $S_6$.

The next step in the sequence of operation involves not only the charge sharing capacitors but also weighting capacitor $C_7$ and switch $S_6$ and is illustrated in FIGURE 5B. Again, it is assumed that the previous comparison resulted in a closure of switch $S_4$ as illustrated in FIGURE 5A. During the step 8*a* illustrated in FIGURE 5B the closure of switch $S_3$ is accompanied by a simultaneous closure of $S_6$. With the simultaneous closures of these two switches the discharge of capacitor $C_1$, i.e., its sharing of charge with capacitor $C_2$ is accompanied by a corresponding discharge of capacitor $C_7$. This results from the fact that switch $S_6$ connects capacitor $C_7$ between ground and a common point 70 between the two equal charge sharing capacitors $C_1$ and $C_2$. The overall result is that charge flows out of the virtual ground at amplifier input node 30 in a quantity corresponding to a change of −.08 volt across capacitor $C_3$. This is illustrated in FIGURE 5B by the charge Q as equal to −.08 volt. Again the minus sign is used to indicate charge flow out of input node 30 rather than into it. At the same time capacitor $C_7$ discharges from .8 volt (the battery voltage) to 1/10 its value, namely .08 volt.

For an understanding of the action of the circuitry in FIGURE 5B it must be remembered that capacitor $C_7$ is equal to 1/12 the capacitance of the equal capacitors $C_1$ or $C_2$. It will further be appreciated that the three capacitors $C_7$, $C_1$ and $C_2$ will necessarily share charge such that the common plate of each of these capacitors connected to common terminal 70 will be at the same potential.

While the transfer of charge may be explained in several ways in conjunction with the change of conditions between FIGURES 5A and 5B let it be assumed that just one of the final conditions illustrated in FIGURE 5B exists, that is capacitor $C_2$ has charged up from the zero voltage of FIGURE 5A to a voltage of .08 volt with the polarity illustrated in FIGURE 5B. Neglecting for a moment the action of capacitor $C_7$, in order for capacitor $C_2$ to charge up from zero volts to .08 volt potential a total charge must have flowed out of the amplifier node 30 corresponding to −.08 as given in FIGURE 5B. However, since capacitor $C_1$ and $C_2$ are connected in series this same current or charge flow must have also passed through capacitor $C_1$, the direction and quantity of charge being such as to tend to change the potential across capacitor $C_1$ from the .1 volt potential of FIGURE 5A to a potential of .02 volt (.10−.08=.02).

The above neglected the action of capacitor $C_7$. The tendency for the potential across capacitor $C_1$ to otherwise drop to .02 volt is in fact counteracted by the partial discharge of capacitor $C_7$. Since this capacitor has a capacitance 1/12 the value of capacitor $C_1$, and remembering that $e=Q/C$, the flow of charge from capacitor $C_7$ to capacitor $C_1$ necessary to raise the potential across capacitor $C_1$ by .06 volt (.02+.06=.08, the final condition previously assumed) will be accompanied by a 12 fold drop in the potential across capacitor $C_7$, i.e., a drop in potential of 12 times .06 volt or a total change in potential across capacitor $C_7$ of .72 volt. Since this capacitor was initially at the battery potential of .8 volt is now arrives at the assumed common potential with respect to ground of .08 volt.

FIGURES 6A and 6B show steps 7*b* and 8*b* in the encoding sequence. These steps correspond to the steps 7*a* and 8*a* of FIGURES 5A and 5B with the exception that in FIGURES 6A and 6B, it is assumed that the previous comparison produced an output pulse from the comparator on line 50 closing switch $C_5$ instead of switch $S_4$ as previously assumed. The conditions resulting from the closure of shorting switch $S_5$ are illustrated in FIGURE 6A where capacitor $C_1$ is discharged through this switch to zero potential. As in the previously described situation capacitor $C_7$ is charged to the battery voltage of .8 volt and now capacitor $C_2$ has a potential of .1 volt remaining from the first five operations on the analog voltage or quantities as given by the quasi-binary series of conversion.

FIGURE 6B illustrates the next step in which switches $S_6$ and $S_3$ are closed simultaneously corresponding to the alternative procedure occurring at pulse or step 8 in FIGURE 2 wherein the output voltage $e_o$ during the previous comparison was less than the reference voltage at input 38 of the comparator, i.e., negative with respect to ground. Again in order to explain the operation of the circuit it will be assumed that the desired final condition exists, i.e., that the common point 70 of the capacitors is at a −.08 volt potential with respect to ground. In order for this situation to exist capacitor $C_2$ must have dropped in potential from the .1 volt value of step 7*b* shown in FIGURE 6A to a potential of .08 volt as illustrated in FIGURE 6B. This means that a charge corresponding to .02 volt change on capacitor $C_3$ must have flowed into the amplifier input node 30. The sign of this charge flow or current is positive to indicate that the charge flow is into the node rather than out of it as previously was the case as illustrated in FIGURE 5B.

Since capacitors $C_1$ and $C_2$ are connected in series between the ground at the lower plate of capacitor $C_1$ and the virtual ground of input node 30 this same current must flow through capacitor $C_1$. Thus ignoring the action of capacitor $C_7$ the current flow through capacitor $C_1$ would tend to charge up the capacitor to a potential of .02 volt with the polarity indicated in FIGURE 6B. However, as was the case previously the capacitor $C_7$ is at the initiation of step 8*b* charged to the battery potential of .8 volt and hence this capacitor discharges into capacitor $C_2$. Since capacitor $C_7$ has a capacitance 1/12 of the capacitance of either capacitor $C_1$ or $C_2$ (these latter being equal) a transfer of charge from capacitor $C_7$ to capacitor $C_1$ takes place sufficient to raise its potential by .06 volt (from .02 volt to .08 volt). This transfer diminishes the potential across capacitor $C_7$ by a 12 fold factor, that is 12 times .06 volt or by .72 volt. As a result capacitor $C_7$ discharges from .8 volt (the battery potential) to .08 volt, the final condition assumed for this capacitor.

It can be seen from a comparison of FIGURES 5B and FIGURE 6B that the conditions for the sixth change in potential across capacitor $C_3$, given by the sixth quantity in the quasi-binary series are satisfied. That is, when the previous comparison indicates the output potential $e_o$ to be positive steps 7*a* and 8*a* follow and charge is removed from this capacitor, i.e., flows out of the amplifier input node 30, by a factor that is equal to −.08. However, if the previous comparison indicated a negative output votlage $e_o$, then steps 7*b* and 8*b* of FIGURES 6A and 6B follow and charge flows into the amplifier input node 30 to increase the potential on capacitor $C_3$ by a factor of .02 volt. At the same time charge sharing capacitors $C_1$ and $C_2$ arrive at a potential of .08 volt no matter which series of steps is followed. Thus these capacitors are capable of performing the following steps to give the ±.04, ±.02, and ±.01, changes for the next decimal digit of the comparison sequence. Also at this same time capacitor $C_7$ is discharged to 1/10 of its value, that is from the battery potential of .8 volt to a new potential of .08 volt, still with the same polarity. In this way capacitor $C_7$ is made ready for its cooperation in the charge sharing process during the next closure of switch $S_6$. This closure occurs next during the tenth operation on capacitors $C_3$ in accordance with the quasi-binary series. It may also occur on the fourteenth step if more than three decimal digits are encoded. While only a three decimal digit comparison is illustrated it will be understood that as many digits as desired may be processed in accordance with the required accuracy.

It is apparent from the above that the present invention provides a simplified and inexpensive binary coded decimal analog-to-digital converter. Using conventional circuit elements, the entire converter is small enough to be mounted on two side-by-side printed circuit boards providing an extremely compact, light weight arrangement. By means of the provision of only a unipolar compensating capacitor 66 and corresponding switch $S_{2a}$ and the weighting capacitor $C_7$ and corresponding switch $S_6$ the output of the converter changes from a straight binary output to the binary coded decimal output herein described. In situations where desired, these latter elements may be simply omitted or switched out of the circuit and the converter used for straight analog-to-digital (binary) conversion.

While a specific circuit and specific examples have been given based upon a unipolar input where the analog input voltage may vary anywhere between zero and plus one volt, it is apparent that other arrangements can be employed and that the circuit is suitable for different voltage range inputs and for bipolar as well as unipolar inputs. Similarly while an arrangement for an 8–4–2–1 binary code is illustrated it will be apparent that the circuit may be adapted to other conventional codes such as a 4–4–2–1 code and the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An analog-to-digital converter comprising a pair of charge sharing capacitors, means for charging said capacitors at the beginning of in encoding period, a charge transfer amplifier having a feedback capacitor, a programmer, switch means responsive to said programmer for periodically coupling said charge sharing capacitors in series between ground and the input of said amplifier, a comparator, means coupling the output of said amplifier to one input of said comparator, means coupling the other input of said comparator to a reference potential, means for impressing an analog signal to be converted on said feedback capacitor, means responsive to the output of said comparator for periodically discharging one of said charge sharing capacitors, a weighting capacitor, and switch means responsive to said programmer for periodically coupling said weighting capacitor to the input of said amplifier.

2. A converter according to claim 1 including means for charging said weighting capacitor at the beginning of an encoding period.

3. An analog-to-digital converter comprising a pair of equal charge sharing capacitors, a reference source, means for charging said equal capacitors from said reference source to values equal in magnitude at the beginning of an encoding period, a charge transfer amplifier having a feedback capacitor, a programmer, switch means responsive to said programmer for periodically coupling said equal capacitors in series between ground and the input of said amplifier, a comparator, means coupling the output of said amplifier to one input of said comparator, means for impressing a sample of an analog voltage to be converted onto said feedback capacitor, means coupling the other input of said comparator to a reference potential, selective switch means responsive to the output of said comparator for discharging one or the other of said equal capacitors so as to successively bring the voltage at the output of said amplifier nearer in value to said reference potential, a weighting capacitor, means for coupling said weighting capacitor to said reference source at the beginning of an encoding period, and switch means responsive to said programmer for periodically coupling said weighting capacitor to the input of said amplifier.

4. A converter according to claim 3 wherein said charge transfer amplifier is provided with an input capacitor, said feedback capacitor being coupled across said input capacitor to the input of said charge transfer amplifier.

5. An analog to digital converter comprising a charge transfer amplifier having an input capacitor and a feedback capacitor, said amplifier establishing a circuit ground, a pair of equal capacitors, first switch means for coupling said equal capacitors in series between ground and the input of said amplifier, a reference source, second switch means for coupling said source between ground and a point intermediate said equal capacitors, means for impressing a sample of an analog signal to be converted across said feedback capacitor, a shorting switch for each of said equal capacitors, a programmer, a comparator responsive to said pragrammer for selectively closing one of said shorting switches, means coupling one of the inputs of said comparator to the output of said amplifier, means coupling the other input of said comparator to ground, a weighting capacitor and third switch means for coupling said weighting capacitor between ground and said intermediate point between said capacitors.

6. A converter according to claim 5 including a unipolar compensating circuit, and fourth switch means for coupling said compensating circuit between said source and the input of said amplifier.

7. A converter according to claim 6 wherein said compensating circuit comprises a series resistor and shunt capacitor between said source and said amplifier input.

8. An analog to digital converter comprising a storage device for receiving an analog signal $e_a$, means coupled to said storage device for modifying said analog signal according to the following progression such that said signal converges toward zero:

$$(e_a-.8),\ \pm.4,\ \pm.2,\ \pm.1,\ \begin{pmatrix}+.02\\-.08\end{pmatrix};\ \pm.04,\ \pm.02,\ \pm.01\ \begin{pmatrix}+.002\\-.008\end{pmatrix};\ \ldots$$

and means coupled to said storage device for sensing the sign of the terms in said progression.

9. An analog to digital converter comprising a storage capacitor developing an output signal $e_o$, means coupled to said storage capacitor for impressing thereon an analog signal $e_a$, means coupled to said storage capacitor for modifying said output signal $e_o$ according to the following quasi-binary series which converges toward zero:

$$e_o=f(e_a)\left[(e_a-.8),\ \pm.4,\ \pm.2,\ \pm.1,\ \begin{matrix}(+.02)\\-.08\end{matrix};\ \pm.04,\ \pm.02\ \pm.01,\ \begin{matrix}(+.002)\\-.008\end{matrix};\ \ldots\right]$$

and means coupled to said storage device for sensing the sign of the terms in said progression.

10. An analog to digital converter for converting an analog signal into a binary coded decimal digit signal comprising a storage capacitor, means for impressing a sample of an analog signal to be converted across said storage capacitor, a pair of charge sharing capacitors, switch means for periodically coupling said charge sharing capacitors together whereby half of the charge on one of said sharing capacitors flows to the other, means coupling said sharing capacitors to said storage capacitor for modifying the signal on said storage capacitor proportional to the total charge shared by said charge sharing capacitors, a charge weighting capacitor, and means for coupling said weighting capacitor to said sharing capacitors once for every predetermined plurality of operations of said switch means for coupling said charge sharing capacitors together.

11. A converter according to claim 10 wherein said charge sharing capacitors are of equal capacitance, and said weighting capacitor has a capacitance equal to $1/12$ the value of one of said sharing capacitors.

12. An analog to digital converter for converting an analog signal into a binary coded decimal digit signal according to an 8–4–2–1 binary code comprising a pair of equal charge sharing capacitors, a charge transfer amplifier having a storage capacitor in its feedback path, said amplifier being heavily fed back through said storage capacitor whereby the input node of said amplifier is held at a virtual ground by feedback, means for impressing a sample of an analog voltage to be converted onto said feedback capacitor, means for periodically discharging one of said sharing capacitors, means for periodically coupling said sharing capacitors in series with said input node once for each binary bit in said code whereby half the charge on one of said sharing capacitors flows to the other of said sharing capacitors and a signal proportional to the amount of shared charge is accumulated on said storage capacitor, a weighting capacitor having a capacitance equal to $1/12$ the capacitance of one of said sharing capacitors, and means for periodically coupling said weighting capacitor to said amplifier node once for the least significant bit of each decimal digit in said code.

13. A converter according to claim 12 including a comparator coupled to the output of said amplifier, said comparator controlling said periodic discharging means, and means for deriving a digital output signal from said comparator.

14. A converter according to claim 13 including a programmer for developing a plurality of programming signals, and means coupling said programming signals to said switch means, said coupling means, and said comparator.

References Cited

UNITED STATES PATENTS

| | | | |
|---|---|---|---|
| 3,216,002 | 11/1965 | Hoffman | 390—347 |
| 3,235,862 | 2/1966 | Fiorni | 390—347 |
| 3,314,062 | 4/1967 | Pommerening | 320—1 |

MAYNARD R. WILBUR, Primary Examiner

J. GLASSMAN, Assistant Examiner

UNITED STATES PATENT OFFICE
CERTIFICATE OF CORRECTION

Patent No. 3,462,759 August 19, 1969

Philip A. Hoffman

It is certified that error appears in the above identified patent and that said Letters Patent are hereby corrected as shown below:

Column 3, line 50, that portion of the formula reading $(e_a-.8,$ should read $(e_a-.8),$ Column 5, line 9, the formula should appear as shown below:

$$e_o=-K[(e_a-.8\ v.)\pm.4\ v.]$$

Signed and sealed this 19th day of May 1970.

(SEAL)
Attest:

Edward M. Fletcher, Jr.
Attesting Officer

WILLIAM E. SCHUYLER, JR.
Commissioner of Patents